(12) United States Patent
Suzuka (10) Patent No.: US 10,011,309 B1
(45) Date of Patent: Jul. 3, 2018

(54) CANOPY FOR INCREASING FUEL EFFICIENCY BY REDUCING DRAG OF A PICKUP TRUCK

(71) Applicant: Yoshitaka Suzuka, Sakura (JP)

(72) Inventor: Yoshitaka Suzuka, Sakura (JP)

( * ) Notice: Subject to any disclaimer, the term of this patent is extended or adjusted under 35 U.S.C. 154(b) by 0 days.

(21) Appl. No.: 15/625,971

(22) Filed: Jun. 16, 2017

(51) Int. Cl.
*B62D 35/00* (2006.01)
*B62D 33/06* (2006.01)
*B62D 33/02* (2006.01)

(52) U.S. Cl.
CPC .......... *B62D 35/001* (2013.01); *B62D 33/02* (2013.01); *B62D 33/06* (2013.01); *B60Y 2200/141* (2013.01)

(58) Field of Classification Search
CPC ....... B62D 35/001; B62D 33/02; B62D 33/06
USPC ..................................................... 296/180.1
See application file for complete search history.

(56) References Cited

U.S. PATENT DOCUMENTS

| | | | | |
|---|---|---|---|---|
| D286,143 S | * | 10/1986 | Lund | D12/181 |
| 5,301,913 A | * | 4/1994 | Wheatley | B60R 9/00 248/231.41 |
| 6,126,229 A | * | 10/2000 | Lund | B60J 1/2008 296/180.1 |
| 6,983,977 B1 | * | 1/2006 | Kozak | B62D 35/001 296/180.1 |
| 2016/0236727 A1 | | 8/2016 | Herndon | |

* cited by examiner

*Primary Examiner* — Joseph Pape
(74) *Attorney, Agent, or Firm* — FisherBroyles, LLP; Rob L. Phillips (57) ABSTRACT

A drag-reducing pickup truck canopy includes an upper portion having a generally rectangular shape with one long side acting as a front edge and an opposite long side acting as a rear edge, the upper portion having a downward sloping section extending between the front edge and the rear edge, two side portions with one side portion extending downward and tapering outward from each short side of the upper portion, and two support portions extending outward from lower edges of the side portions. The upper portion may include a substantially flat portion adjacent to the front edge and/or a substantially flat portion adjacent the rear edge.

16 Claims, 7 Drawing Sheets

CANOPY FOR INCREASING FUEL EFFICIENCY BY REDUCING DRAG OF A PICKUP TRUCK

FIELD OF THE INVENTION

The embodiments of the present invention relate to a canopy attachable to a pickup truck cab and/or bed. The canopy serves to reduce drag and increase fuel efficiency of a pickup truck.

BACKGROUND

Fuel efficiency is a significant factor with automotive vehicles. Better fuel efficiency is directly related to conservation of fossil fuels and reduction of carbon emissions. Pickup trucks are unique vehicles because of the open bed. Studies show that the open bed causes air flow to become turbulent which naturally increases drag thereby reducing fuel efficiency.

Accordingly, it would be advantageous to develop a canopy attachable to a pickup truck which serves to eliminate or reduce the turbulent air created by air flow into the pickup truck bed.

SUMMARY

In one embodiment, the canopy comprises an upper portion having a generally rectangular shape with one long side acting as a front edge and an opposite long side acting as a rear edge, said upper portion having a downward sloping section extending between said front edge and said rear edge, two side portions with one side portion extending downward and tapering outward from each short side of said upper portion, and two support portions extending outward from lower edges of said side portions.

In other embodiments, the upper portion includes one or more substantially flat portions. In one embodiment, a flat portion extends rearward from said front edge until trending into a downward slope. In another embodiment, a flat portion extends forward from said rear edge until meeting a lowermost point of a downward slope. In another embodiment, the upper portion includes both flat portions with a downward slope therebetween.

The configuration of the canopy permits positioning the canopy adjacent to a rear of the pickup truck cab and into airspace of the pickup truck bed essentially extending a roofline of the cab such that air flow over the cab is guided over an exposed portion of the bed thereby eliminating or reducing turbulent air.

Other variations, embodiments and features of the present invention will become evident from the following detailed description, drawings and claims.

DETAILED DESCRIPTION

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

The canopy described herein may be fabricated of any number of materials including, but not limited to, plastics, composites, alloys, metals, polymers, ceramics, glasses, woods and/or combinations thereof. The canopy may be fabricated using one or more techniques including, but not limited to, machining, additive printing, forming, injection molding, casting, thermoforming and/or combinations thereof. Those skilled in the art will recognize that other materials and fabrication techniques may be used. The canopy may be fabricated as a single piece or multiple pieces attached to one another.

Figure 1:
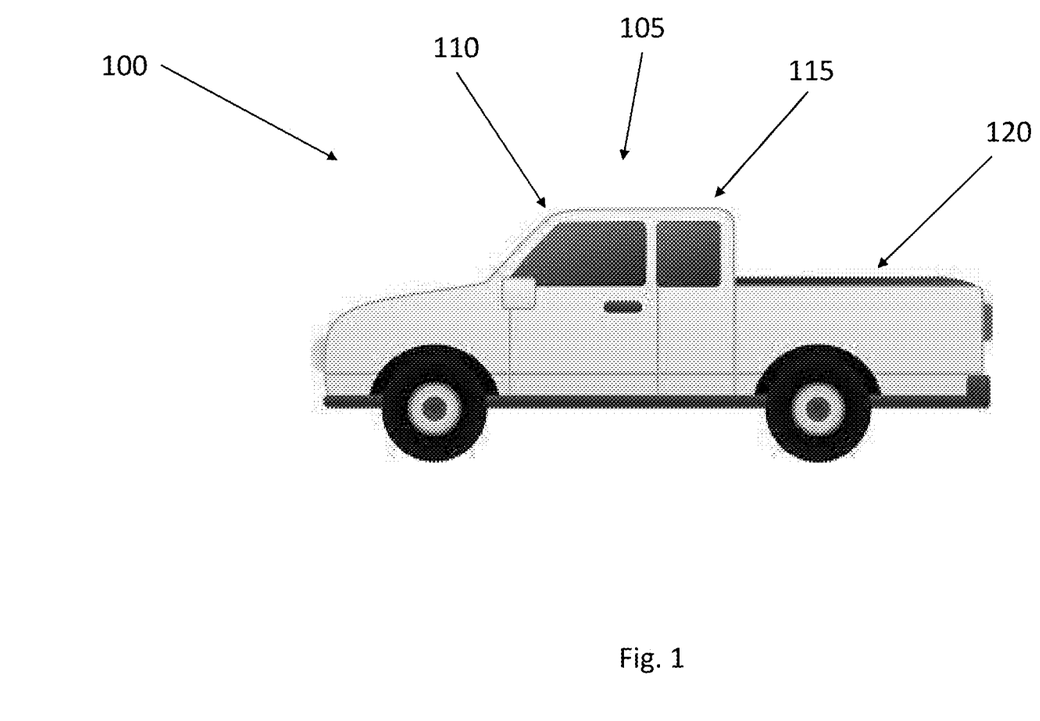
FIG. 1 illustrates a side view of a pickup truck which may benefit from the embodiments of the present invention.
Figure 2:
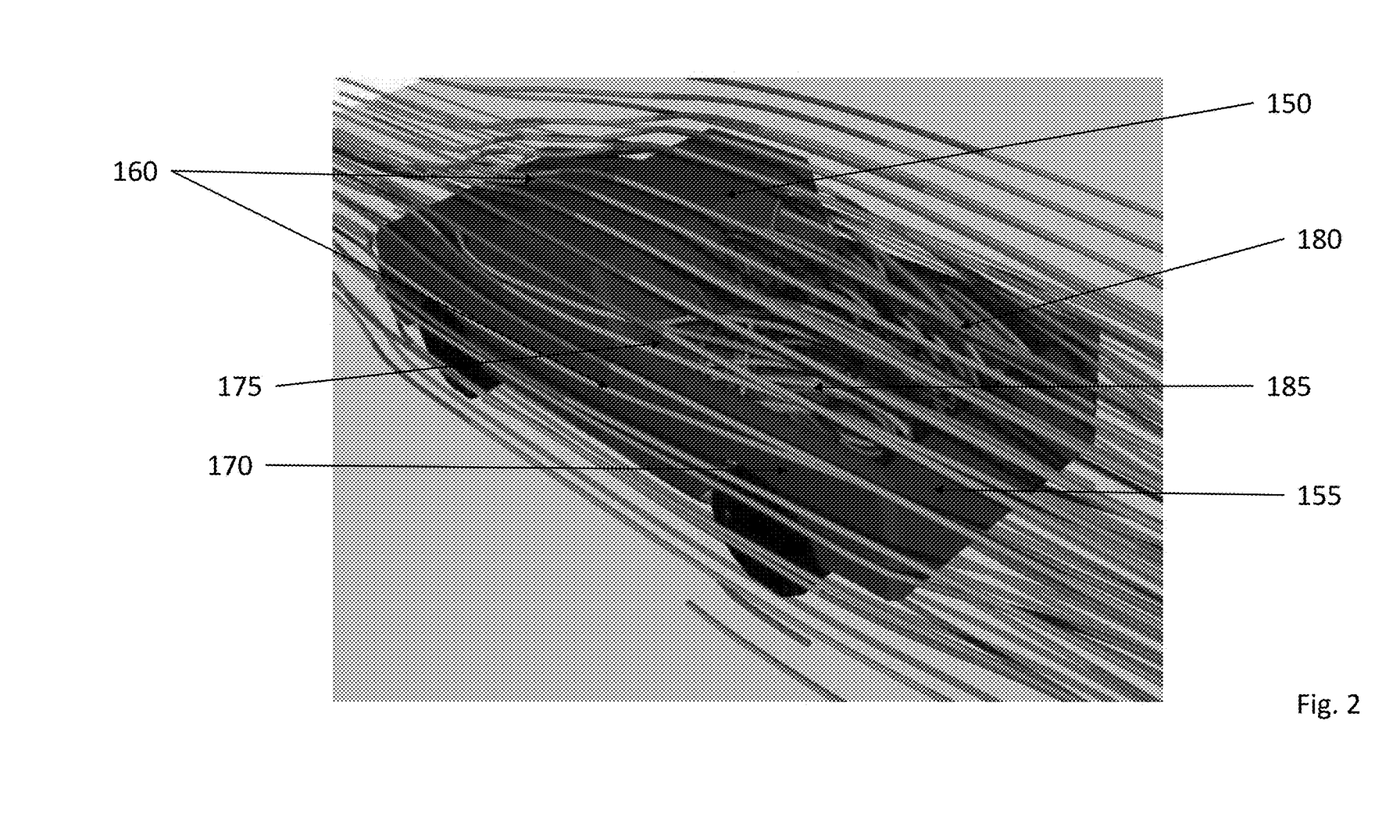
FIG. 2 illustrates an upper view of air flow over a pickup truck.

FIG. 1 shows a standard pickup truck 100. A shown, the pickup truck 100 comprises a cab section 105 having a primary cab 110 and extra cab 115, and a truck bed 120. Other pickup truck configurations including those with a primary cab only, extended cabs, short beds and long beds may benefit from the embodiments of the present invention. FIG. 2 shows air flow over and around a pickup truck 150 with a rear gate 155 closed. Air 160 flows smoothly over and around the pickup truck cab 165 and along the sides 170 of the pickup truck bed 175. Some air 180 flows smoothly over the pickup truck bed 175. Other air 185 is captured in the area defined by the truck bed 175. It is this turbulent air 185 that increases drag associated with the pickup truck.

Turbulent air is characterized by chaotic changes in flow velocity and pressure preventing it from flowing smoothly over the body of the pickup truck. Drag acts parallel and in the same direction as the airflow. The drag coefficient of an automobile impacts the way the automobile passes through the surrounding air. Aerodynamic drag increases with the square of speed (Drag=$C_d \times r \times A=0.5 \times V^2$ where $C_d$ is a coefficient of drag, r is density of the fluid, A is area and V is velocity). Therefore, aerodynamic drag becomes critically important at higher speeds given the square of velocity. Reducing the drag coefficient in an automobile improves the performance of the vehicle as it pertains to speed and fuel efficiency.

Figure 3:
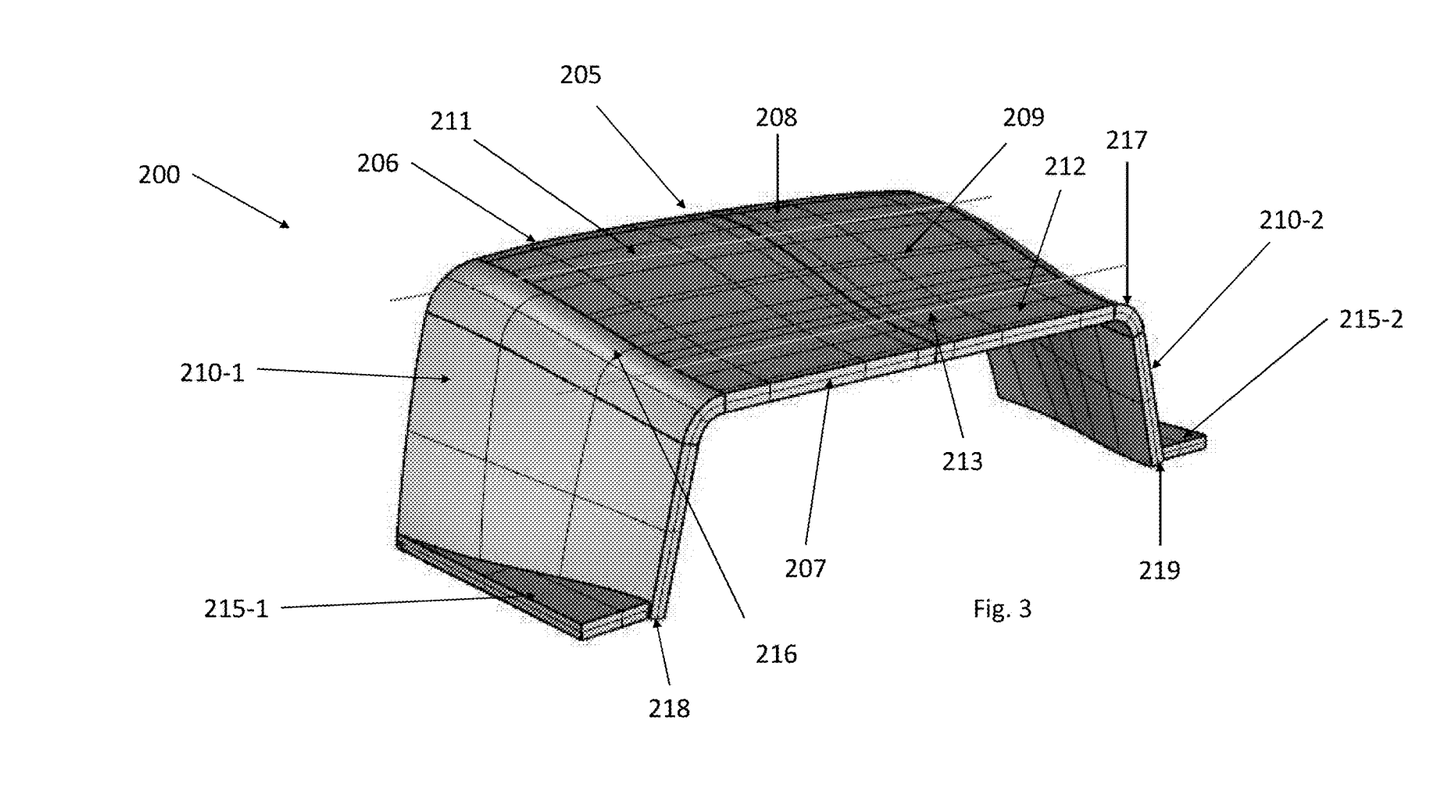
FIG. 3 illustrates a perspective view of a canopy according to the embodiments of the present invention.

FIG. 3 shows a canopy 200 according to the embodiments of the present invention. The canopy 200 broadly includes an upper portion 205, two side portions 210-1, 210-2 and two support portions 215-1, 215-2. The upper portion 205 has a generally rectangular shape with one long side acting as a front edge 206 and an opposite long side acting as a rear edge 207. The upper portion 205 has a substantially flat portion 208 extending rearward of said front edge 206 and a downward sloping section 209 extending from an aft end line 211 of the flat portion 208 to the rear edge 207 of the upper portion 205. In one embodiment, the flat portion 208 extends 10%-20% of the distance between the front edge 206 and rear edge 207. In other embodiments, the flat portion 208 may be less than 10% or more than 20% of the distance between the front edge 206 and rear edge 207. In one embodiment, a second substantially flat portion 212 extends forward from the rear edge 207 to a forward end line 213. In one embodiment, the second flat portion 212 extends 10%-20% of the distance between the rear edge 207 and front edge 206. In other embodiments, the second flat portion 212 may be less than 10% or more than 20% of the distance between the rear edge 207 and front edge 206. Depending on the embodiment, the upper portion 205 of the canopy 200 may have no flat portions (i.e., only a downward slope), a single flat portion or two flat portions.

The two side portions 210-1, 210-2 extend downward and taper slightly outward from each short side 216, 217 of said upper portion 205. The two side portions 210-1, 210-2 also taper inward from said front to said rear of said canopy 200. The support portions 215-1, 215-2 create a canopy support proximate to lower edges 218, 219 of said side portions 210-1, 210-2, respectively.

Figure 4A:
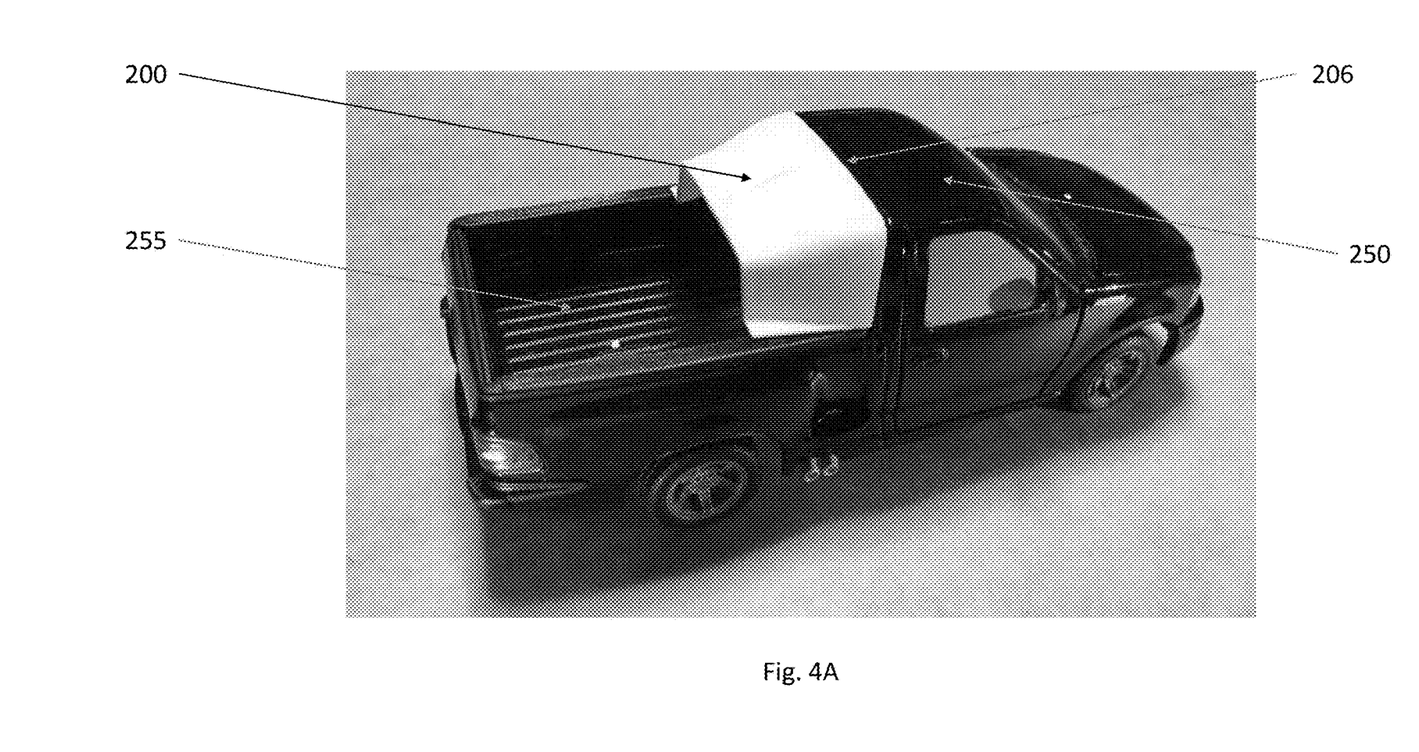
FIGS. 4A-4D illustrate various views of the canopy positioned on a pickup truck according to the embodiments of the present invention.
Figure 4B:
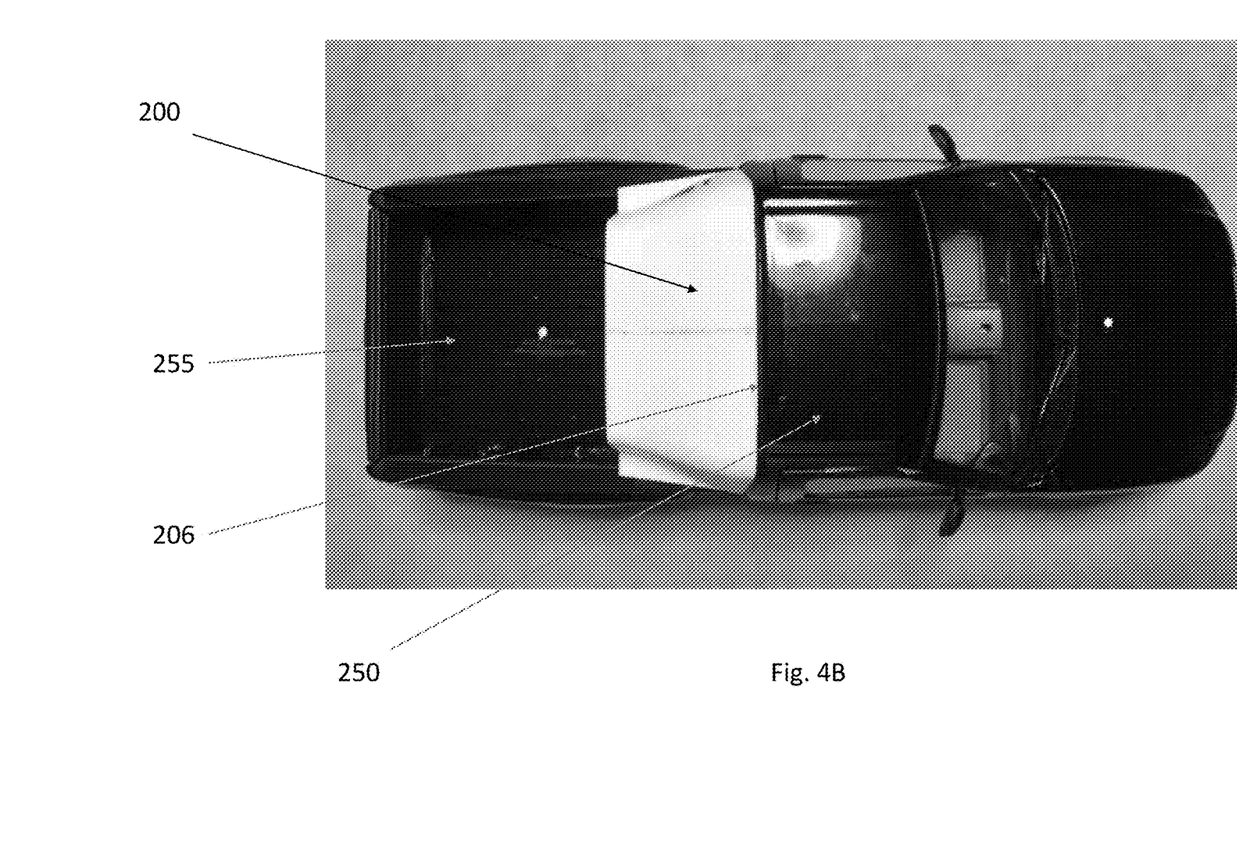
Figure 4C:
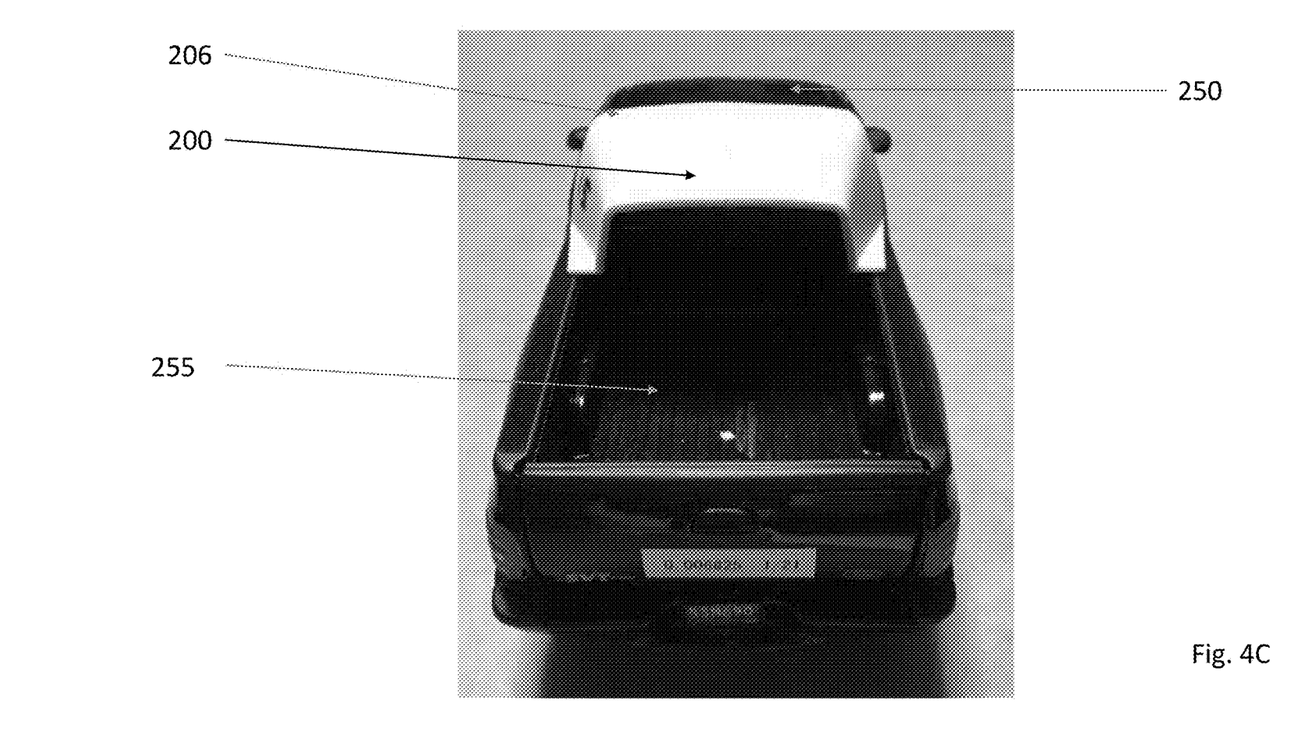
Figure 4D:
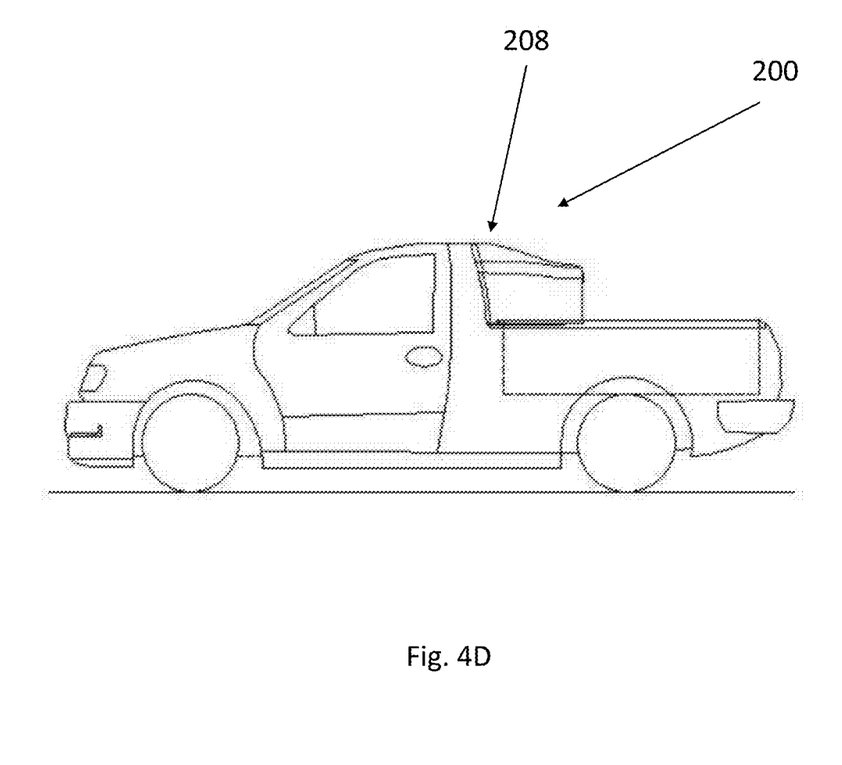

FIGS. 4A-4D show various views of the canopy 200 positioned on a pickup truck according to the embodiments of the present invention. The canopy 200 is positioned flush with the top 250 of the cab of the pickup truck. The front edge 206 abuts against a rear of the top 250 effectively extending the top 250 into the bed 255 of the pickup truck. Front edges of the side portions 210-1, 210-2 abut against a rear surface of the pickup truck cab. FIG. 4D shows flat portion 208.

The downward slope of the upper portion 205 and inward taper of the two side portions 210-1, 210-2 act to direct air flow over and around said pickup truck bed 255 and the abutment of the canopy 200 against the cab prevents any meaningful aerodynamic drag therebetween. Directing air flow over and around said pickup truck bed 255 reduces turbulent air and correspondingly drag.

Wind tunnel tests using the canopy 200 on a pickup truck having a coefficient of drag equal to 0.402. With the canopy 200 in place, the coefficient of drag drops to 0.337. This reduction in the coefficient of drag has a direct reduction on the overall drag of the vehicle and as such increases the fuel efficiency of the pickup truck.

Attaching the canopy 200 to the pickup truck maybe accomplished using any number of means including fasteners, adhesives, magnets or others. The canopy may be attached to the cab and/or bed of the pickup truck. Ideally, the canopy 200 is removably attached to the pickup truck although in other embodiments the canopy 200 may be permanently attached to the pickup truck. The dimensions of the canopy 200 may be modified to fit different styles and sizes of trucks.

Although the invention has been described in detail with reference to several embodiments, additional variations and modifications exist within the scope and spirit of the invention as described and defined in the following claims.

I claim:

1. A drag-reducing canopy comprising:
an upper portion having a rectangular shape with a front edge and an oppositely positioned rear edge, said front edge longer than said rear edge, said upper portion sloping downward between said front edge and said rear edge, two oppositely positioned side portions extending downward and tapering outward from said upper portion between said front edge and said rear edge, and a support portion extending outward from a lower edge of each of said two oppositely positioned side portions, and wherein said side portions taper inward from a front of said canopy to a rear of said canopy.

2. The drag-reducing canopy of claim 1 further comprising a flat portion extending rearward from said front edge of said upper portion, said flat portion further extending between said two oppositely positioned side portions.

3. The drag-reducing canopy of claim 2 wherein said flat portion extends rearward from said front edge of said upper portion 10% to 20% of the distance between said front edge and said rear edge.

4. The drag-reducing canopy of claim 1 further comprising a flat portion extending forward from said rear edge of said upper portion, said flat portion further extending between said two oppositely positioned side portions.

5. The drag-reducing canopy of claim 4 wherein said flat portion extends forward from said rear edge of said upper portion 10% to 20% of the distance between said rear edge and said front edge.

6. The drag-reducing canopy of claim 1 wherein said support portions increase in width from a front of said canopy to a rear of said canopy.

7. A drag-reducing canopy comprising:
an upper portion having a rectangular shape with a front edge and an oppositely positioned rear edge, said front edge longer than said rear edge, said upper portion having a first flat portion extending rearward from said front edge and a second flat portion extending forward from said rear edge with a downward sloping section extending between said first flat portion and said second flat portion, two oppositely positioned side portions extending downward and tapering outward from said upper portion between said front edge and said rear edge, and a support portion extending outward from a lower edge of each of said two oppositely positioned side portions, and wherein said side portions taper inward from a front of said canopy to a rear of said canopy.

8. The drag-reducing canopy of claim 7 wherein said first flat portion extends rearward from said front edge of said upper portion 10% to 20% of the distance between said front edge and said rear edge.

9. The drag-reducing canopy of claim 7 wherein said second flat portion extends forward from said rear edge of said upper portion 10% to 20% of the distance between said rear edge and said front edge.

10. The drag-reducing canopy of claim 7 wherein said support portions increase in width from a front of said canopy to a rear of said canopy.

11. A truck comprising
a cab with a bed rear thereof; and
a canopy attached to said cab and/or said bed, said canopy comprising:
an upper portion having a rectangular shape with a front edge and an oppositely positioned rear edge, said front edge longer than said rear edge, said upper portion sloping downward between said front edge and said rear edge, two oppositely positioned side portions extending downward and tapering outward from said upper portion between said front edge and said rear edge, and a support portion extending outward from lower edges of each of said two oppositely positioned side portions, and wherein said side portions taper inward from a front of said canopy to a rear of said canopy.

12. The truck of claim 11 wherein said canopy further comprises a flat portion extending rearward from said front edge of said upper portion, said flat portion further extending between said two oppositely positioned side portions.

13. The truck of claim 12 wherein said flat portion extends rearward from said front edge of said upper portion 10% to 20% of the distance between said front edge and said rear edge.

14. The truck of claim 11 wherein said canopy further comprises a flat portion extending forward from said rear edge of said upper portion, said flat portion further extending between said two oppositely positioned side portions.

15. The truck of claim 14 wherein said flat portion extends forward from said rear edge of said upper portion 10% to 20% of the distance between said rear edge and said front edge.

16. The truck of claim 11 wherein said support portions increase in width from a front of said canopy to a rear of said canopy.

\* \* \* \* \*